(12) United States Patent
Cao et al.

(10) Patent No.: US 11,892,741 B2
(45) Date of Patent: Feb. 6, 2024

(54) DISPLAY DEVICE AND ELECTRONIC BADGE

(71) Applicant: BOE Technology Group Co., Ltd., Beijing (CN)

(72) Inventors: Lei Cao, Beijing (CN); Junmin Sun, Beijing (CN); Jinggang Wei, Beijing (CN); Wenbin Wang, Beijing (CN); Zifeng Wang, Beijing (CN); Yan Ren, Beijing (CN); Yunpeng Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 105 days.

(21) Appl. No.: 17/546,948

(22) Filed: Dec. 9, 2021

(65) Prior Publication Data

US 2022/0187674 A1 Jun. 16, 2022

(30) Foreign Application Priority Data

Dec. 15, 2020 (CN) .......................... 202023026138.9

(51) Int. Cl.
*G02F 1/16753* (2019.01)
*G06K 19/07* (2006.01)
*G02F 1/167* (2019.01)

(52) U.S. Cl.
CPC .......... *G02F 1/16753* (2019.01); *G02F 1/167* (2013.01); *G06K 19/07* (2013.01)

(58) Field of Classification Search
CPC ...... G02F 1/167; G02F 1/16753; G06K 19/07
See application file for complete search history.

(56) References Cited

U.S. PATENT DOCUMENTS

| | | | | |
|---|---|---|---|---|
| 7,844,505 | B1* | 11/2010 | Arneson | G06Q 10/087 705/28 |
| 8,648,709 | B2* | 2/2014 | Gauger | G08G 1/0962 340/539.1 |
| 2016/0264394 | A1* | 9/2016 | Hershberger | G01G 19/52 |
| 2016/0339748 | A1* | 11/2016 | Lesesky | B60C 23/0447 |
| 2016/0375733 | A1* | 12/2016 | Lesesky | B60C 23/0494 340/442 |
| 2017/0206446 | A1* | 7/2017 | Lesesky | G06K 19/07764 |
| 2018/0338021 | A1* | 11/2018 | Hebert | H04M 1/0277 |
| 2019/0034735 | A1* | 1/2019 | Cuban | G06V 40/16 |
| 2019/0035104 | A1* | 1/2019 | Cuban | G08B 13/196 |
| 2020/0205620 | A1* | 7/2020 | Osborne, Jr. | H04W 4/029 |
| 2020/0380591 | A1* | 12/2020 | Rule | G06T 11/60 |
| 2023/0040424 | A1* | 2/2023 | Gopinathanasari | G06F 3/044 |

* cited by examiner

*Primary Examiner* — Thien M Le
(74) *Attorney, Agent, or Firm* — IPro, PLLC (57) ABSTRACT

Provided is a display device including a front housing, a display panel, a circuit board, a middle frame, a battery module, and a rear housing; wherein the front housing and the middle frame are connected to form an accommodation space, wherein the display panel and the circuit board are disposed in the accommodation space, a battery accommodation portion is disposed on the circuit board, wherein the battery module is disposed in the battery accommodation portion, and the rear housing covers the circuit board and is snap-fit to the middle frame.

19 Claims, 8 Drawing Sheets

DISPLAY DEVICE AND ELECTRONIC BADGE

CROSS-REFERENCE TO RELATED APPLICATION

This application is based on and claims priority to the Chinese Patent Application No. 202023026138.9, filed Dec. 15, 2020 and entitled "DISPLAY DEVICE," the disclosure of which is herein incorporated by reference in its entirety.

TECHNICAL FIELD

The present disclosure relates to the field of electronic technologies, and more particularly, relates to a display device and an electronic badge.

BACKGROUND

The application range of the display technology is popularized with the popularity thereof.

SUMMARY

Embodiments of the present disclosure provide a display device and an electronic badge.

In one aspect of the embodiments of the present disclosure, a display device is provided. The display device includes a front housing, a display panel, a circuit board, a middle frame, a battery module, and a rear housing; wherein the front housing and the middle frame are connected to form an accommodation space, wherein the display panel and the circuit board are disposed in the accommodation space; a battery accommodation portion is disposed on the circuit board, wherein the battery module is disposed in the battery accommodation portion; and the rear housing covers the circuit board and is snap-fit to the middle frame.

In some embodiments, a plurality of first snaps are disposed on a side, facing towards the middle frame, of the rear housing and along an edge of the rear housing;

In some embodiments, a plurality of fitting structures with one of the following structures are disposed on the middle frame: a via in a side of the middle frame, a groove in an inner surface of a side of the middle frame, and a second snap on the inner surface of the side of the middle frame; and the first snap are snap-fit to the fitting structures such that the rear housing is snap-fit to the middle frame.

In some embodiments, a groove is disposed in a side, facing towards the rear housing, of the middle frame, wherein the groove is opened as surrounding an edge of the middle frame; the display device further includes a rubber ring, wherein the rubber ring is disposed in the groove; and a flat surface is disposed on a side, facing towards the middle frame, of the rear housing, wherein a position of the flat surface corresponds to a position of the groove such that the rubber ring is contact with the flat surface.

In some embodiments, a plurality of bumps are disposed on an inner wall of the groove, wherein the bumps are pressed against the rubber ring to compress the rubber ring.

In some embodiments, the battery module is detachably disposed in the battery accommodation portion.

In some embodiments, the battery accommodation portion includes a mount and a battery clip, wherein a mounting groove is disposed in a side, facing towards the rear housing, of the mount, wherein the battery clip is disposed in the mounting groove, and the battery module is snap-fit to the mount by the battery clip; and a mounting hole is opened in the circuit board, wherein the mount is disposed in the mounting hole.

In some embodiments, the display device further includes a card holder and an employee card, wherein the card holder and the employee card are disposed in the accommodation space; the card holder covers the circuit board; and an employee card accommodation portion is disposed on a side, distal from the circuit board, of the card holder, wherein the employee card is disposed in the employee card accommodation portion.

In some embodiments, a hollow portion is disposed at a position, opposite to the battery module, of the card holder, wherein the battery module is exposable through the hollow portion.

In some embodiments, a transparent area is disposed on the rear housing, wherein the transparent area is opposite to the employee card to show information on the employee card.

In some embodiments, the display device further includes a card holder and an employee card, wherein the card holder and the employee card are disposed in the accommodation space; the card holder covers the circuit board, and an employee card accommodation space is disposed on a side, distal from the circuit board, of the card holder, wherein the employee card is disposed in the employee card accommodation portion.

In some embodiments, a hollow portion is disposed at a position, opposite to the battery module, of the card holder, wherein the battery module is exposable through the hollow portion.

In some embodiments, a connecting frame is disposed on a side, facing towards the circuit board, of the card holder, wherein the connecting frame is arranged along an edge of the hollow portion and is sleeved outside the mount.

In some embodiments, a plurality of mounting holes are disposed in a side wall, opposite to the connecting frame, of the mount, and a plurality of protrusions are disposed on a side wall, opposite to the mount, of the connecting frame, wherein the plurality of protrusions are disposed in the mounting holes to connect the mount to the connecting frame.

In some embodiments, the display device further includes a Bluetooth module disposed at a corner of the circuit board.

In some embodiments, the Bluetooth module is disposed at a corner, distal from the battery accommodation portion, of the circuit board.

In some embodiments, the display device further includes a near-field communication module, wherein the near-field communication is disposed on the circuit board and a communication coil of the near-field communication module is disposed around the battery accommodation portion.

In some embodiments, the display device is an electronic badge, and the display panel is an electrophoretic display panel.

In another aspect of the embodiments of the present disclosure, an electronic badge is provided. The electronic badge includes a front housing, a display panel, a circuit board, a middle frame, a battery module, a card holder, and a rear housing; wherein the front housing and the middle frame are connected to form an accommodation space; the display panel, the circuit board, the battery module, and the card holder are disposed in the accommodation space; the display panel is disposed between the circuit board and the front housing; a battery accommodation portion is disposed on the circuit board; the battery module is disposed in the battery accommodation portion; the card holder covers the circuit board and is disposed on a side, distal from the circuit board, of the card holder; and the rear housing covers the card holder and is snap-fit to the middle frame.

In some embodiments, a groove is disposed in a side, facing towards the rear housing, of the middle frame, wherein the groove is disposed as surrounding an edge of the middle frame; the display device further includes a rubber ring, wherein the rubber ring is disposed in the groove; and a flat surface is disposed on a side, facing towards the middle frame, of the rear housing, wherein a position of the flat surface corresponds to a position of the groove such that the rubber ring is contact with the flat surface.

In some embodiments, a mounting hole is opened in the circuit board, and the battery accommodation portion includes a mount and a battery clip; wherein a mounting groove is disposed in a side, facing towards the rear housing, of the mount, wherein the battery clip is disposed in the mounting groove, and the battery module is snap-fit to the mount by the battery clip; a mounting hole is opened in the circuit board, wherein the mount is disposed in the mounting hole; and a hollow portion is disposed at a position, corresponding to the battery module, of the card holder, and a connecting frame is disposed on a side, facing towards the circuit board, of the card holder, wherein the connecting frame is arranged along an edge of the hollow portion and is sleeved outside the mount.

BRIEF DESCRIPTION OF THE DRAWINGS

For clearer descriptions of the technical solutions in the embodiments of the present disclosure, the accompanying drawings required for describing the embodiments are introduced hereinafter. Apparently, the accompanying drawings in the following description show merely some embodiments of the present disclosure, and persons of ordinary skill in the art may still derive other drawings from these accompanying drawings without any creative efforts.

DETAILED DESCRIPTION

In order to make the objectives, technical solutions, and advantages of the present disclosure clearer, the present disclosure will be further described in detail below in conjunction with specific embodiments and with reference to the accompanying drawings.

It should be noted that, unless otherwise defined, the technical or scientific terms used in the present disclosure should be given the ordinary meanings as understood by those with ordinary skill in the art to which this disclosure belongs. The terms "first," "second," and the like used in the present disclosure do not indicate any order, quantity or importance, but are only used to distinguish different components. The terms "include," "comprise," and variations thereof mean that the element or item appearing in front of the word covers the element or item listed behind the word and its equivalents, but does not exclude other elements or items. The terms "coupled," "connected," and the like are not to be limited to physical or mechanical connections, but can include electrical connections, whether direct or indirect. The terms "up," "down," "left," "right," and the like are only used to indicate the relative position relationship. In the case that the absolute position of the described object changes, the relative position relationship may also change accordingly.

An embodiment of the present disclosure provides a display device. The display device includes a front housing, a display panel, a circuit board, a middle frame, a battery module, and a rear housing, wherein the front housing and the middle frame are connected to form an accommodation space, wherein the display panel and the circuit board are disposed in the accommodating space; a battery accommodating portion is disposed on the circuit board, wherein the battery module is disposed in the battery accommodating portion; and the rear housing covers the circuit board and is snap-fit to the middle frame.

The display device according to the embodiment of the present disclosure is cleverly designed and assembled by combining the front housing, the display panel, the circuit board, the middle frame, the battery module, and the rear housing, and the reasonable position of the accommodation space or the accommodation portion enables the display device to have the advantages of lightness and thinness while ensuring its strength; furthermore, due to the rationality of the structural design, the assembling cost and processing cost of the display device are also low, which is conducive to mass production and lower the production costs.

Figure 1:
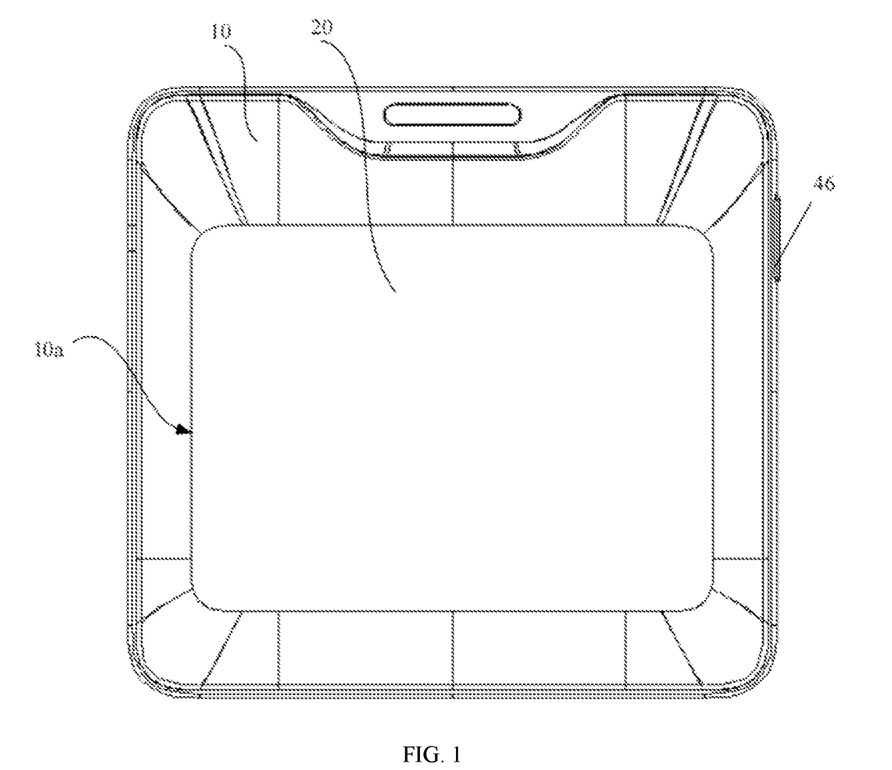
FIG. 1 is a front view of an exemplary display device according to an embodiment of the present disclosure.
Figure 2:
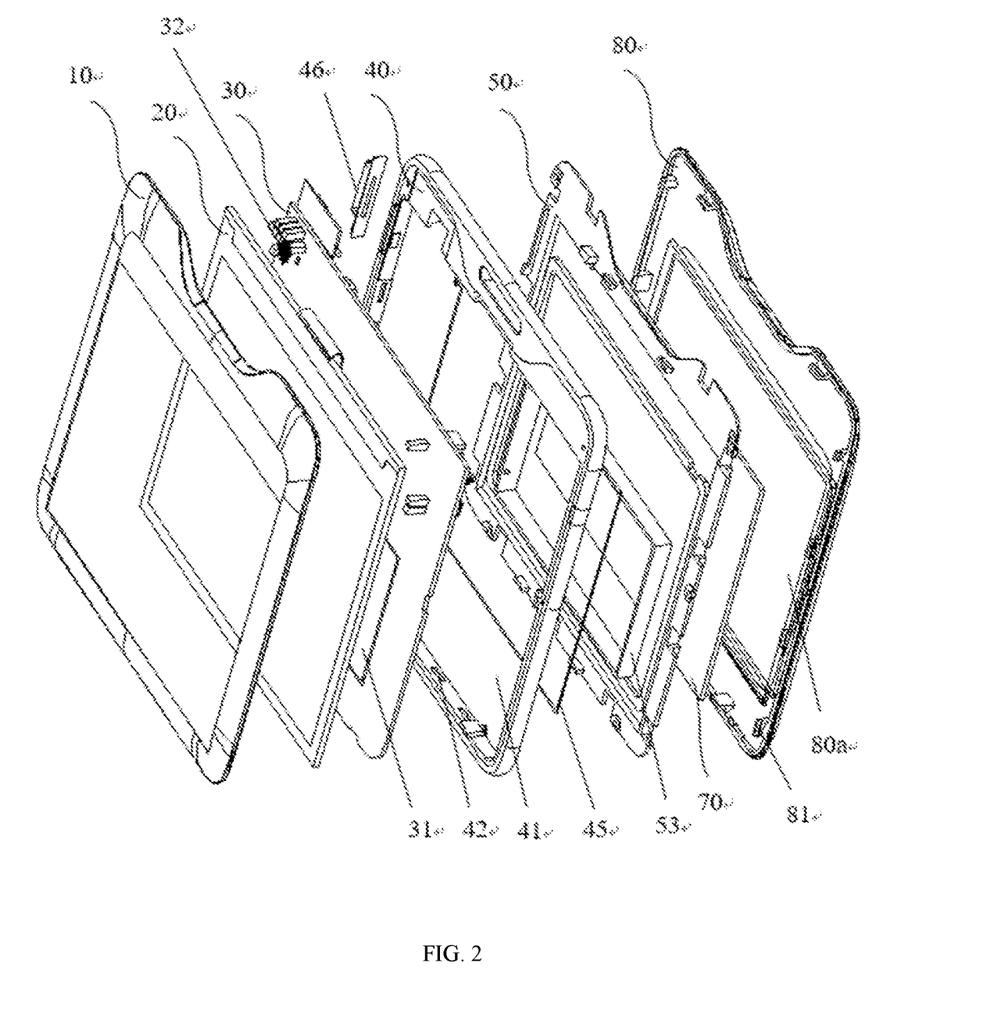
FIG. 2 is a structural exploded view of an exemplary display device according to an embodiment of the present disclosure.

FIG. 1 is a front view of an exemplary display device according to an embodiment of the present disclosure. FIG. 2 is a structural exploded view of an exemplary display device according to an embodiment of the present disclosure;

As shown in FIGS. 1 and 2, the display device may include a front housing 10, a display panel 20, a circuit board 30, a middle frame 40, and a rear housing 80.

The front housing 10 and the middle frame 40 may be connected to form the accommodation space 41, wherein the display panel 20 and the circuit board 30 may be disposed in the accommodation space 41. In some embodiments, the front housing 10 and the middle frame 40 may be connected to form the accommodation space 41, and then the display panel 20 and the circuit board 30 may be sequentially disposed in the accommodation space 41. Exemplarily, the front housing 10 and the middle frame 40 are adhered together, and in some examples, the surface, facing the front housing 10, of the middle frame 40 is adhered together with the surface of the front housing 10.

In some embodiments, the display panel 20 may be disposed between the circuit board 30 and the front housing 10 and the light-emitting surface of the display panel 20 faces towards the front housing 10, such that the display screen of the display panel 20 may be displayed outward through the front housing 10. A transparent area 10a is disposed on the front housing 10 to show a display screen of the display panel 20.

In some embodiments, the display panel 20 may be an electrophoretic display (EPD) panel, which may reduce power consumption of the display device. In some embodiments, the display panel 20 may be used to display some information, such as identity information related to the owner of the display device (e.g., the name of the owner) or information of the unit or organization to which the holder belongs (e.g., the employer of the owner). That is, the display device may be used as an electronic badge.

Figure 3:
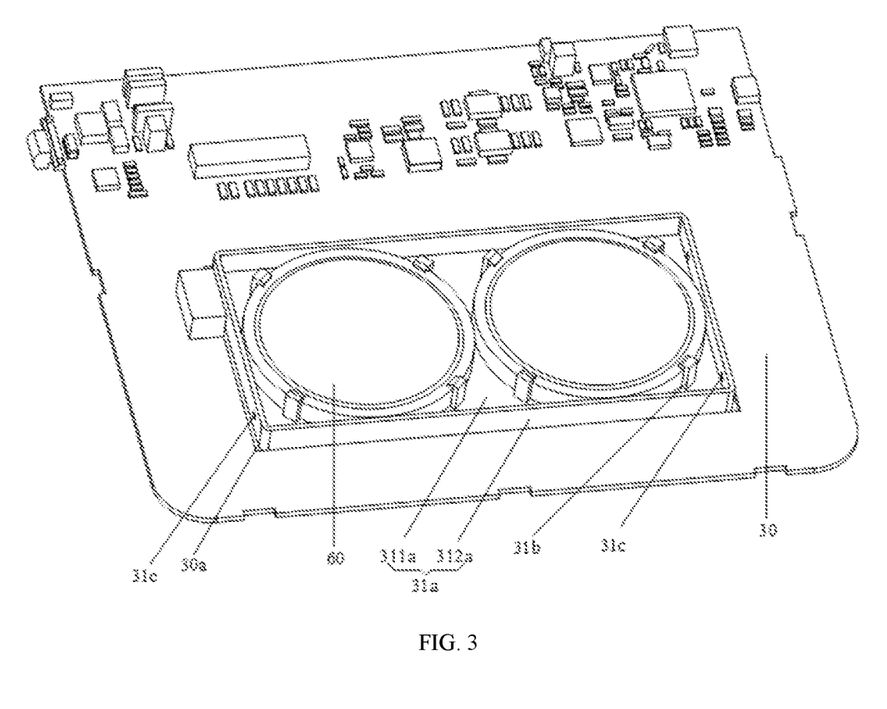
FIG. 3 is an exemplary structural diagram of a circuit board according to an embodiment of the present disclosure.

FIG. 3 is an exemplary structural diagram of a circuit board according to an embodiment of the present disclosure. FIG. 3 is the structure of the other side of the circuit board 30 in FIG. 2, As shown in FIG. 3, the display device also includes a battery module 60. A battery accommodation portion 31 is disposed on the circuit board 30, wherein the battery module 60 is disposed in the battery accommodation portion 31.

In some embodiments, the battery module 60 is detachably disposed in the battery accommodation portion 31 such that the battery module 60 may be replaced and used more conveniently as a separate module.

In some embodiments, as shown in FIG. 3, the battery accommodation portion 31 includes a mount 31a and a battery clip 31b, wherein a mounting groove is disposed in the side, facing towards the rear housing 80, of the mount 31a, wherein the battery clip 31b is disposed in the mounting groove, and the battery module 60 is snap-fit to the mount 31a by the battery clip 31b.

In some embodiments, the mount 31a includes a bottom plate 311a and a side plate 312a. The side plate 312a is arranged as surrounding the bottom plate 311a and being connected at the edge of the bottom plate 311a. The mounting groove is defined by the bottom plate 311a and the side plate 312a.

In some embodiments, the battery module 60 includes at least one battery. For example, two batteries. The battery is snap-fit to the mount 31a by a corresponding set of battery clips 31b.

In conjunction with FIGS. 2 and 3, a mounting hole 30a is opened in the circuit board 30, wherein the mount 31a is disposed in the mounting hole 30a. In some examples, the mounting hole 30a extends through the circuit board 30. In other examples, the mounting hole is a recessed structure disposed on the surface, facing towards the rear housing, of the circuit board 30.

In some embodiments, the battery module 60 may be electrically connected to the circuit board 30 by a structure (not shown in figures) such as a lead, a dome, or the like.

In some embodiments, as shown in FIG. 2, the display device may also include button 46 disposed on the side of the middle frame 40, occupying only a small space of the display device. At the same time, it can be easily connected to or contacted with the circuit board 30 disposed inside the middle frame 40. Exemplarily, the button 46 is configured to generate a control instruction, wherein the control instruction is used to control the display panel 20, including but not limited to opening, closing, switching display content, and the like.

Figure 4:
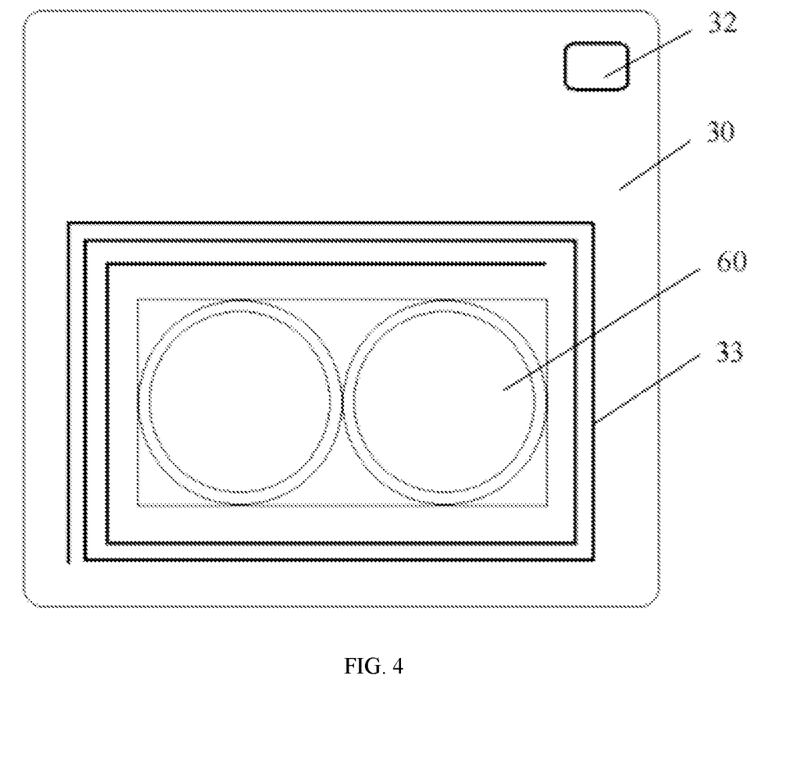
FIG. 4 is an exemplary structural diagram of another circuit board according to an embodiment of the present disclosure.

In some embodiments, as shown in FIGS. 2 and 4, the display device may further include a Bluetooth module 32 for implementing Bluetooth communication between the display device and external device. In some embodiments, the Bluetooth module 32 is disposed at a corner of the circuit board 30, such that the Bluetooth module 32 may communicate with the outside world better. In some embodiments, as shown in FIG. 2, the Bluetooth module 32 may be disposed at a corner, distal from the battery accommodation portion 31, of the circuit board 30, such that the structural design is more reasonable, and the quality of the Bluetooth signal is also ensured.

In some embodiments, the display device may further include a near-field communication (NFC) module (not shown) for implementing the near-field communication between the display device and an external device. In some embodiments, the NFC module is disposed on the circuit board 30 and the communication coil 33 of the NEC module is disposed around the battery accommodation portion 31, as shown in FIG. 4. By arranging the communication coil 33 of the NEC module around the battery accommodation portion 31 on the circuit board 30, in one aspect, the area of the coil is increased to make the NFC signal better, in the other aspect, a wrap-around design of the coil is adopted to conserve routing space.

Employee badge, in general, is a card-like item designed by a company for the convenience of employees to check in and out of various places of the company. With the development of electronic technologies, the functions of badge have gradually become intelligent, and electronic badges have emerged. Compared with traditional badges, electronic badges integrate more functions. However, in the case that multiple functions are integrated on the electronic badges, how to thinning the electronic badges becomes a problem. In addition, the electronic badge is an application scenario of the electrophoretic display technology. How to make the electronic badge have the advantages of lightness, thinness, low cost, and diversified functions is an urgent problem to be solved.

In view of this, in some embodiments, as shown in FIG. 2, the display device may also include a card holder 50 and an employee card 70. The identity information of the employee is built in the employee card 70 for identifying the employee. In the case that the display device is integrated with the employee card 70, the display device used as an electronic badge for employees to check in and out of the company, some places only accessible to the employees, and the like. In some embodiments, as the electronic badge, the display panel 20 of the display device may also display some employee information, such as employee ID, department, position, possession rights, and the like. In the case that the display panel 20 of the display device is damaged or out of power, identification may be achieved by the employee card 70.

Figure 5:
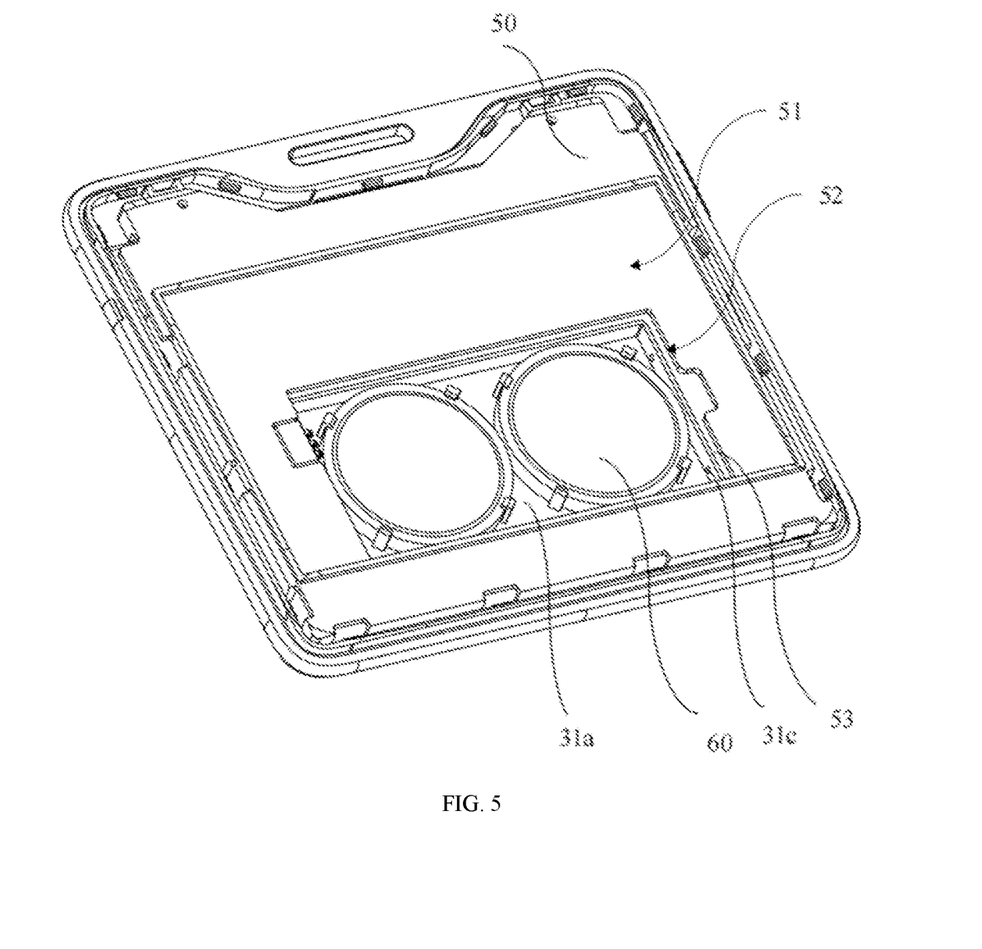
FIG. 5 is an exemplary structural diagram of a semi-finished display device after the card holder is installed according to an embodiment of the present disclosure.

FIG. 5 is an exemplary structural diagram of a semi-finished display device after the card holder is installed according to an embodiment of the present disclosure. As shown in FIG. 5, the card holder 50 may cover the circuit board 30, and an employee card accommodation portion 51 may be disposed on a side, distal from the circuit board 30, of the card holder, wherein the employee card 70 is disposed in the employee card accommodation portion 51.

In some embodiments, a hollow portion 52 is disposed at a position, opposite to the battery module 60, of the card holder 50, wherein the battery module 60 is exposable through the hollow portion 52, such that the battery module 60 can be replaced by disassembling the rear housing 80 of the display device and removing the employee card 70, which is convenient to use.

In some examples, a connecting frame 53 is disposed on a side, facing towards the circuit board 30, of the card holder 50, wherein the connecting frame 53 is arranged along an edge of the hollow portion 52 and is sleeved outside the mount 31a.

In some examples, a plurality of mounting holes 31c are disposed in a side wall, opposite to the connecting frame 53, of the mount 31a, and a plurality of protrusions are disposed on a side wall, opposite to the mount 31a, of the connecting frame 53, wherein the plurality of protrusions are disposed in the mounting holes 31c to connect the mount 31a to the connecting frame 53.

The rear housing 80 may cover the employee card 70 and may be snap-fit to the middle frame 40.

In some examples, referring to FIG. 2 again, a transparent area 80a is disposed on the rear housing 80 to show information on the employee card 70. Exemplarily, an opening is disposed in the rear housing 80, wherein a transparent cover plate (e.g., a plastic cover plate, a glass cover plate, or the like) is disposed in the opening, and the area defined by the opening is the transparent area 80a.

The connecting structure between the rear housing 80 and the middle frame 40 is further explained below.

In some examples, the middle frame 40 is a frame structure formed by connecting the sides end to end, such as a rectangular frame structure.

In some embodiments, as shown in FIG. 2, a plurality of first snaps 81 are disposed on a side, facing towards the middle 40, of the rear housing 80 and along an edge of the rear housing 80, Accordingly, a plurality of fitting structures are disposed on the middle frame 41, wherein the fitting structures corporate with a plurality of the first snaps 81.

In some examples, the fitting structure is a via. A plurality of vias may be disposed in the side of the middle frame 40, wherein the vias extend, in a direction perpendicular to the centerline of the frame structure, through the sides in which they are disposed. The first snap 81 may be snap-fit to the corresponding via to make the rear housing 80 snap-fit to the middle 40, such that the middle frame 40 and the rear housing 80 can be detachably connected, thereby facilitating disassembling and assembling.

In other examples, the fitting structure is a groove. As shown in FIG. 2, the plurality of grooves 42 are disposed on the inner surface of the side of the middle frame 40, The first snap 81 may be snap-fit to the corresponding groove 42 to make the rear housing 80 snap-fit to the middle frame 40, such that the middle frame 40 and the rear housing 80 can be detachably connected, thereby facilitating disassembling and assembling.

Figure 6:
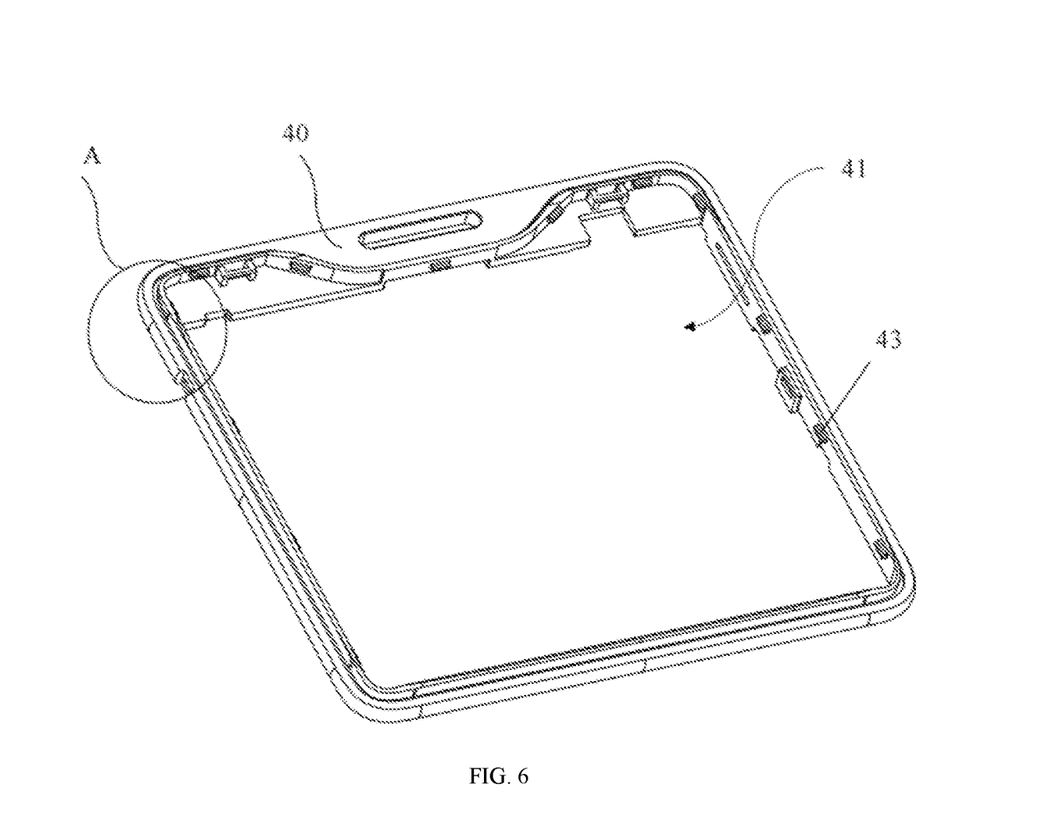
FIG. 6 is an exemplary structural diagram of a middle frame attached to a front housing according to an embodiment of the present disclosure.

In other examples, the fitting structure is a second snap. As shown in FIG. 6, a plurality of second snaps 43 may be disposed on the inner surface (i.e., the inner wall) of the side of the middle frame 40. The first snap 81 may be snap-fit to the corresponding second snap 43, such that the rear housing 80 is snap-fit to the middle frame 40. In this way, the middle frame 40 and the rear housing 80 may be detachably connected, thereby facilitating disassembling and assembling. Exemplarily, the second snap 43 is a bump protruding from the surface where it is located and disposed along the direction perpendicular to the center line of the frame structure.

Figure 7:
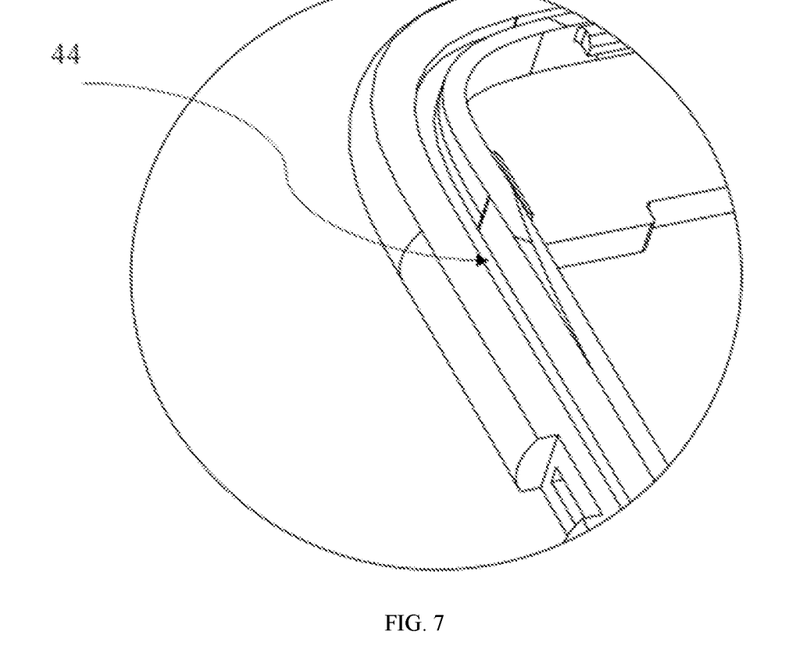
FIG. 7 is an enlarged schematic view of an area A in the FIG. 6.
Figure 8:
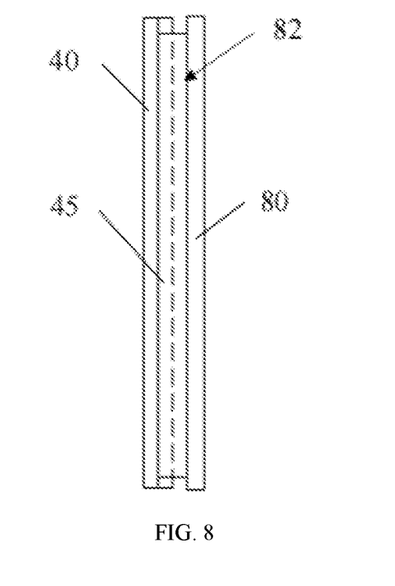
FIG. 8 is an exemplary cross-sectional structural diagram of a compression rubber ring between the middle frame and the rear housing according to an embodiment of the present disclosure.

FIG. 7 is an enlarged schematic view of an area A in the FIG. 6. In some embodiments, as shown in FIG. 7, a groove 44 is disposed in a side, facing towards the rear housing 80, of the middle frame 40, wherein the groove 44 is opened as surrounding an edge of the middle frame 40, and the rubber ring 45 is disposed in the groove 44. As shown in FIG. 8, a flat surface 82 is disposed on a side, facing towards the middle frame 40, of the rear housing 80, wherein the position of the flat surface 82 corresponds to the position of the groove 44, and the rear housing 80 is snap-fit to the middle frame 40 so that the rubber ring 45 is in contact with the flat surface 82, such that the rear housing 80 and middle frame 40 compress the rubber ring 45 with a snap to ensure the waterproof reliability of the display device.

Figure 9:
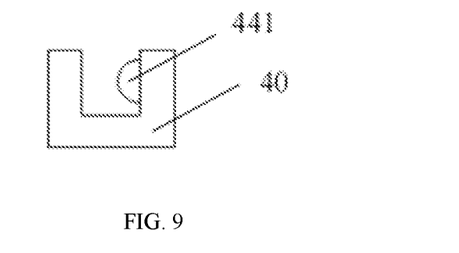
FIG. 9 is an exemplary cross-sectional structural diagram of a middle frame and a bump according to an embodiment of the present disclosure.

In some embodiments, as shown in FIG. 9, a plurality of bumps 441 are disposed in the groove 44 wherein the bumps 441 are pressed against the rubber ring 45 which is disposed in the groove 44 to strengthen the fixing of the rubber ring 45 and prevent the rubber ring 45 from falling out of the groove 44. For strengthening the fixing effect of the bump on the rubber ring, the surface of the bump 441 may be roughened, or a silicone layer may be disposed on the surface of the hump 441 to enhance the friction between the rubber ring and the bump.

The display device according to the embodiments of the present disclosure is cleverly designed and assembled by combining the front housing, the display panel, the circuit board, the middle frame, the battery module, and the rear housing, and the reasonable position of the accommodation space or the accommodation portion enables the display device to have the advantages of lightness and thinness while ensuring its strength. Furthermore, due to the rationality of the structural design, the assembling cost and processing cost of the display device are also low, which is conducive to mass production and lower production costs.

It should be understood by those skilled in the art that the above discussion of any of the embodiments above is exemplary only and is not intended to suggest that the scope of the disclosure (including the claims), is limited to these examples; within the spirit of the disclosure, the above embodiments, or technical features in different embodiments, can also be combined, the steps can be implemented in any order, and many other variations of the various aspects of the disclosure as described above are not provided in details for brevity.

The disclosure is intended to embrace all such alternatives, modifications and variations that fall within the broad scope of the appended claims. Thus, any omissions, modifications, equivalents, improvements, and the like, which can be made within the spirit and principles of the present disclosure, should be embraced within the protection scope of this disclosure.

What is claimed is:

1. A display device, comprising a front housing, a display panel, a circuit board, a middle frame, a battery module, and a rear housing; wherein
   the front housing and the middle frame are connected to form an accommodation space, wherein the display panel and the circuit board are disposed in the accommodation space;
   a battery accommodation portion is disposed on the circuit board, wherein the battery module is disposed in the battery accommodation portion; and
   the rear housing covers the circuit board and is snap-fit to the middle frame;
   wherein the display device is an electronic badge, and the display panel is an electrophoretic display panel.

2. The display device according to claim 1, wherein
   a plurality of first snaps are disposed on the rear housing, wherein the first snaps are disposed on a side, facing towards the middle frame, of the rear housing and along an edge of the rear housing; and a plurality of fitting structures are disposed on the middle frame, wherein the fitting structure is one of the following structures: a via in a side of the middle frame, a groove in an inner surface of the side of the middle frame, and a second snap on the inner surface of the side of the middle frame;

wherein the first snaps are snap-fit to the fitting structures such that the rear housing is snap-fit to the middle frame.

3. The display device according to claim 1, wherein a groove is disposed in a side, facing towards the rear housing, of the middle frame, wherein the groove is opened as surrounding an edge of the middle frame;

the display device further comprises a rubber ring, wherein the rubber ring is disposed in the groove; and a flat surface is disposed on a side, facing towards the middle frame, of the rear housing, wherein a position of the flat surface corresponds to a position of the groove such that the rubber ring is in contact with the flat surface.

4. The display device according to claim 3, wherein a plurality of bumps are disposed on an inner wall of the groove, wherein the bumps are pressed against the rubber ring to compress the rubber ring.

5. The display device according to claim 1, wherein the battery module is detachably disposed in the battery accommodation portion.

6. The display device according to claim 5, wherein the battery accommodation portion comprises a mount and a battery clip; wherein a mounting groove is disposed in a side, facing towards the rear housing, of the mount, wherein the battery clip is disposed in the mounting groove, and the battery module is snap-fit to the mount by the battery clip; and a mounting hole is opened in the circuit board, wherein the mount is disposed in the mounting hole.

7. The display device according to claim 6, further comprising a card holder and an employee card;

wherein the card holder and the employee card are disposed in the accommodation space; the card holder covers the circuit board, and an employee card accommodation space is disposed on a side, distal from the circuit board, of the card holder, wherein the employee card is disposed in the employee card accommodation portion.

8. The display device according to claim 7, wherein a hollow portion is disposed at a position, opposite to the battery module, of the card holder, wherein the battery module is exposable through the hollow portion.

9. The display device according to claim 8, wherein a connecting frame is disposed on a side, facing towards the circuit board, of the card holder, wherein the connecting frame is arranged along an edge of the hollow portion and is sleeved outside the mount.

10. The display device according to claim 9, wherein a plurality of mounting holes are disposed in a side wall, opposite to the connecting frame, of the mount, and a plurality of protrusions are disposed on a side wall, opposite to the mount, of the connecting frame, wherein the plurality of protrusions are disposed in the mounting holes to connect the mount to the connecting frame.

11. The display device according to claim 1, further comprising a card holder and an employee card;

wherein the card holder and the employee card are disposed in the accommodation space; the card holder covers the circuit board, and an employee card accommodation portion is disposed on a side, distal from the circuit board, of the card holder, wherein the employee card is disposed in the employee card accommodation portion.

12. The display device according to claim 11, wherein a hollow portion is disposed at a position, opposite to the battery module, of the card holder, wherein the battery module is exposable through the hollow portion.

13. The display device according to claim 11, wherein a transparent area is disposed on the rear housing, wherein the transparent area is opposite to the employee card to show information on the employee card.

14. The display device according to claim 1, further comprising a Bluetooth module disposed at a corner of the circuit board.

15. The display device according to claim 14, wherein the Bluetooth module is disposed at a corner, distal from the battery accommodation portion, of the circuit board.

16. The display device according to claim 1, further comprising a near-field communication module, wherein the near-field communication is disposed on the circuit board, and a communication coil of the near-field communication module is disposed around the battery accommodation portion.

17. An electronic badge, comprising a front housing, a display panel, a circuit board, a middle frame, a battery module, a card holder, and a rear housing; wherein the front housing and the middle frame are connected to form an accommodation space, wherein the display panel, the circuit board, the battery module and the card holder are disposed in the accommodation space;

the display panel is disposed between the circuit board and the front housing;

a battery accommodation portion is disposed on the circuit board, wherein the battery module is disposed in the battery accommodation portion, and the card holder covers the circuit board and is disposed on a side, distal from the circuit board, of the card holder; and the rear housing covers the card holder and is snap-fit to the middle frame.

18. The electronic badge according to claim 17, wherein a groove is disposed in a side, facing towards the rear housing, of the middle frame, wherein the groove is disposed as surrounding an edge of the middle frame;

the display device further comprises a rubber ring, wherein the rubber ring is disposed in the groove; and a flat surface is disposed on a side, facing towards the middle frame, of the rear housing, wherein a position of the flat surface corresponds to a position of the groove such that the rubber ring is in contact with the flat surface.

19. The electronic badge according to claim 18, wherein the battery accommodation portion comprises a mount and a battery clip; wherein a mounting groove is disposed in a side, facing towards the rear housing, of the mount, wherein the battery clip is disposed in the mounting groove, and the battery module is snap-fit to the mount by the battery clip;

a mounting hole is opened in the circuit board, wherein the mount is disposed in the mounting hole; and a hollow portion is disposed at a position, opposite to the battery module, of the card holder, and a connecting frame is disposed on a side, facing towards the circuit board, of the card holder, wherein the connecting frame is arranged along an edge of the hollow portion and is sleeved outside the mount.

* * * * *